United States Patent [19]

Yamato

[11] Patent Number: 4,671,241

[45] Date of Patent: Jun. 9, 1987

[54] METHOD FOR CONTROLLING THE FUEL SUPPLY OF AN INTERNAL COMBUSTION ENGINE

[75] Inventor: Akihiro Yamato, Shiki, Japan

[73] Assignee: Honda Giken Kogyo Kabushiki Kaisha, Tokyo, Japan

[21] Appl. No.: 736,868

[22] Filed: May 22, 1985

[30] Foreign Application Priority Data

May 23, 1984 [JP] Japan .................................. 59-104314

[51] Int. Cl.$^4$ ........................ F02D 41/34; F02D 41/04
[52] U.S. Cl. .................................... 123/478; 123/492; 123/493
[58] Field of Search ............... 123/478, 480, 492, 493, 123/436

[56] References Cited

U.S. PATENT DOCUMENTS

| | | | |
|---|---|---|---|
| 4,214,306 | 7/1980 | Kobayashi | 123/480 X |
| 4,257,377 | 3/1981 | Kinugawa et al. | 123/480 X |
| 4,442,812 | 4/1984 | Mizuno et al. | 123/480 X |
| 4,479,186 | 10/1984 | Takao et al. | 123/480 X |
| 4,558,672 | 12/1985 | Baccadoro et al. | 123/493 X |

Primary Examiner—Tony M. Argenbright

Attorney, Agent, or Firm—Birch, Stewart, Kolasch & Birch

[57] ABSTRACT

There is a method for controlling the fuel supply of an internal combustion engine having a throttle valve in the intake air system. It is detected that an angular position of a crankshaft of the engine coincides with a predetermined crankshaft angular position. Whenever this coincidence is detected, the pressure in the intake air passage downstream of the throttle valve and the engine rotating speed or the value of the inverse number thereof is detected on the basis of the interval between the detections of the crankshaft angular position. The reference basic fuel supply amount which is to be supplied to the engine is determined in accordance with the present detection value $P_{BAn}$ of the pressure in the intake air passage. The present reference value $M_{eAVEn}$ having a predetermined functional relationship to the present detection value $M_{en}$ and previous reference value $M_{eAVE(n-1)}$ of the engine speed or of the value in inverse proportion thereof is set. The correction fuel supply amount is decided on the basis of the present reference value $M_{eAVEn}$ and is added to the basic fuel supply amount. Then the injection amount of fuel commensurate with the result of this addition is supplied to the engine. Thus, the driveability of the engine is improved.

5 Claims, 9 Drawing Figures

METHOD FOR CONTROLLING THE FUEL SUPPLY OF AN INTERNAL COMBUSTION ENGINE

BACKGROUND OF THE INVENTION

1. Field of the Invention

The present invention relates to a method for controlling the fuel supply of an internal combustion engine.

2. Description of the Prior Art

There are many fuel injection types for injecting and supplying fuel to an internal combustion engine of automobiles or the like by an injector. Among these types, there is a type in which: a pressure in the intake air passage, downstream of the throttle valve of the intake air system, and an engine rotating speed are detected. A basic fuel injection time duration $T_i$ is determined at a period synchronized with the engine rotating speed, in accordance with the result the detection. Further, an increase or decrease correcting coefficient is multiplied by the basic fuel injection time duration $T_i$, in accordance with other engine operation parameters such as an engine coolant temperature or the like, or with a transient change of the engine, thereby determining a fuel injection time duration $T_{out}$ corresponding to the amount of the required fuel injection.

In general, in the case where an angular position of a throttle valve is almost constant and is low, as in the idle operating state, for instance, there is a relation as indicated by the solid line in FIG. 1 between the engine rotating speed $N_e$ and an absolute pressure $P_{BA}$ of the pressure in the intake air passage. When the engine speed $N_e$ decreases, the absolute pressure $P_{BA}$ immediately increases, so that the fuel injection time duration becomes long and the engine output torque also increases, causing the engine rotating speed $N_e$ to be increased. An increase in engine speed $N_e$ causes the absolute pressure $P_{BA}$ to be immediately reduced, so that the fuel injection time duration becomes short and the engine output torque decreases, causing the engine speed $N_e$ to be reduced. The engine speed $N_e$ in the idle operating state is stabilized with the aid of such a function. However, this function is satisfied merely in the case where the volume of the intake air passage is small. If this volume contrarily is large, the above-described relation between the engine speed and the absolute pressure as shown by the solid line in FIG. 1 is not satisfied. Practically speaking, even when the engine rotating speed $N_e$ decreases, the absolute pressure $P_{BA}$ does not increase immediately. Therefore, the fuel injection time duration does not change and the engine output torque is not enlarged enough to recover the engine rotating speed, so that the engine speed $N_e$ is further reduced. Thereafter, the absolute pressure $P_{BA}$ increases after a slight time delay and the engine output torque increases, so that the engine speed $N_e$ also increases. Similarly, the reduction of the absolute pressure $P_{BA}$ is also delayed even when there is an increase in the engine speed $N_e$. Consequently, a change in absolute pressure as shown by the broken line in FIG. 1 is repeated. As described above, if the reference fuel injection time duration $T_i$ is determined on the basis of the engine rotating speed and the pressure in the intake air passage themselves at the time of the control, there is a problem causing the hunting of the engine speed, particularly in the idle operating state as mentioned above.

SUMMARY OF THE INVENTION

It is an object of the present invention to provide a method for controlling the fuel supply which can prevent the hunting of the engine rotating speed when the angular position of the throttle valve is low, in the idle operating state or the like, thereby improving the driveability of the engine.

According to the fuel supply controlling method of the invention, it is detected that an angular position of a crankshaft of the engine coincides with a predetermined crankshaft angular position. Whenever the above-mentioned coincidence is detected, the pressure in the intake air passage downstream of the throttle valve is detected and an engine rotating speed or a value of the inverse number of the engine rotating speed is detected on the basis of the interval between the detections of the predetermined crankshaft angular position. A basic fuel supply amount of the fuel to be supplied to the engine is determined in accordance with the present detection value $P_{BAn}$ of the pressure in the intake air passage and the present reference value $M_{eAVEn}$, having predetermined functional relations with regard to the present detection value $M_{en}$ of the engine rotating speed or of the value of the inverse number thereof and to the preceding reference value $M_{eAVE(n-1)}$ one sampling before is set. A correction fuel supply amount of fuel to be supplied to the engine is decided on the basis of the present reference value $M_{eAVEn}$. This correction fuel supply amount is added to the basic fuel supply amount, and the injection amount of fuel commensurate with the result of this addition is supplied to the engine.

BRIEF DESCRIPTION OF THE DRAWINGS

FIGS. 5, 5a and 5b show a flow chart for the operation of the control circuit showing an embodiment of the invention.

DETAILED DESCRIPTION OF THE PREFERRED EMBODIMENT

An embodiment of the present invention will now be described in detail hereinbelow with reference to FIGS. 2 through 7.

Figure 2:
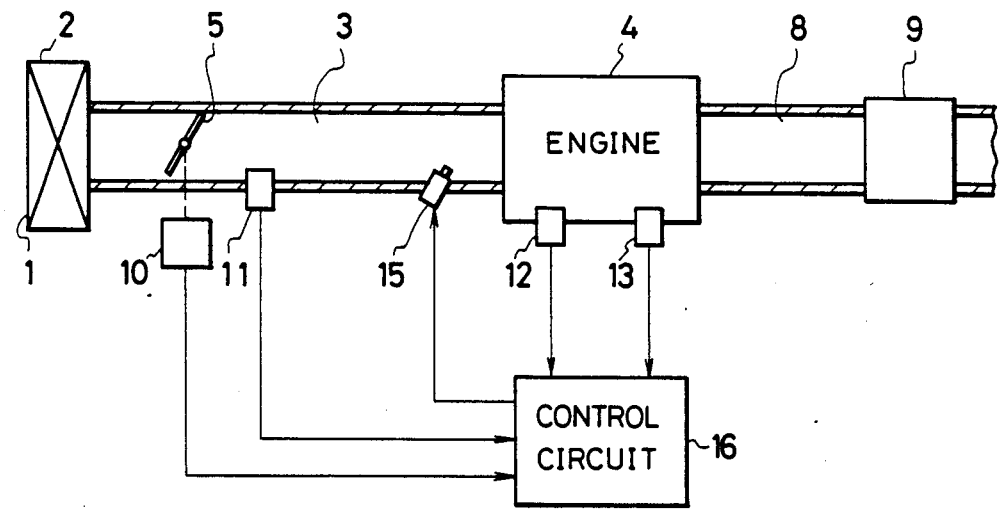
FIG. 2 is an arrangement diagram showing an electronic control type apparatus for supplying the fuel to which a method for controlling the fuel supply according to the present invention is applied.

FIG. 2 shows an electronic control type fuel supplying apparatus to which a method for controlling the fuel supply according to the present invention is applied. In this apparatus, the intake air is supplied from an air intake port 1 to an engine 4 through an air cleaner 2 and an intake air passage 3. A throttle valve 5 is provided in the passage 3, with the amount of intake air provided to the engine 4 being changed depending on the angular position of the throttle valve 5. Three way catalyst 9 is provided in an exhaust gas passage 8 of the engine 4 to promote a decrease in the amount of harmful components (CO, HC and NOx) in the exhaust gas.

A throttle position sensor 10 consists of, for example, a potentiometer and generates an output voltage of a level which is responsive to the angular position of the throttle valve 5. An absolute pressure sensor 11 is provided downstream of the throttle valve 5 and generates an output voltage of a level which corresponds to the magnitude of the pressure. A coolant temperature sensor 12 generates an output voltage of a level which is in accordance with the temperature of the cooling water (or coolant) to cool the engine 4. A crankshaft angular position sensor 13 generates a pulse signal in response to the rotation of a crankshaft (not shown) of the engine 4. For instance, in case of a four-cylinder engine, a pulse is generated from the sensor 13 whenever the crankshaft is rotated by an angle of 180°. An injector 15 is provided in the intake air passage 3 near an intake valve (not shown) of the engine 4. Each output terminal of the sensors 10 to 13 and an input terminal of the injector 15 are connected to a control circuit 16.

Figure 3:
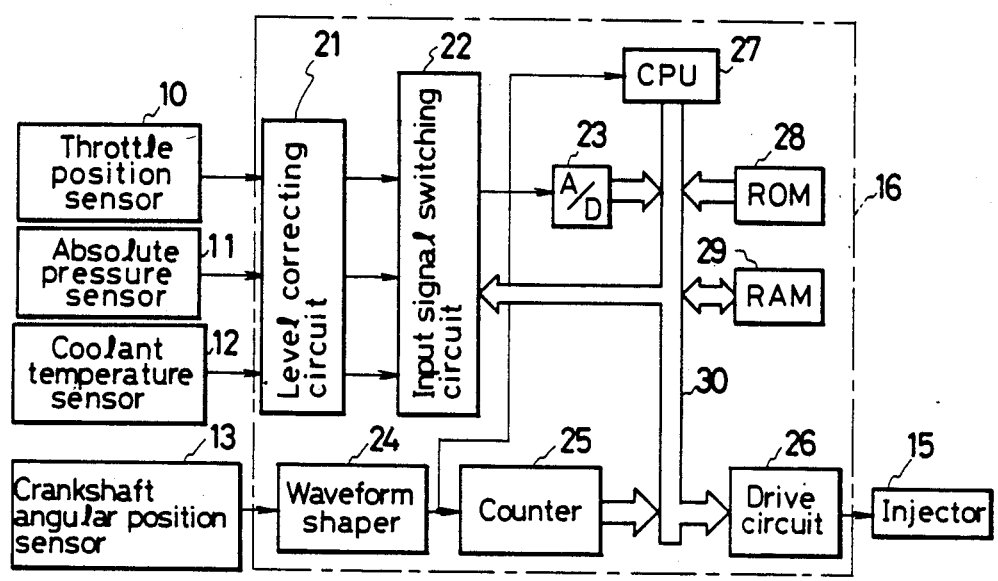
FIG. 3 is a block diagram showing a practical arrangement of a control circuit in the apparatus shown in FIG. 2.

As shown in FIG. 3, the control circuit 16 comprises: a level correcting circuit 21 for correcting the level of each output from the throttle position sensor 10, absolute pressure sensor 11 and coolant temperature sensor 12; an input signal switching circuit 22 for selectively outputting one of the respective sensor outputs derived through the level correcting circuit 21; an A/D (analog-to-digital) converter 23 for converting the analog signal outputted from the switching circuit 22 to a digital signal; a signal waveform shaping circuit 24 for shaping the waveform of the output of the crankshaft angular position sensor 13; an Me counter 25 for measuring the time duration between TDC signals which are output as pulses from the waveform shaper 24; a drive circuit 26 for driving the injector 15; a CPU (central processing unit) 27 for performing digital arithmetic operations in accordance with a program; a ROM (read only memory) 28 in which various kinds of processing programs and data have been stored; and a RAM (random access memory) 29. The input signal switching circuit 22, the A/D converter 23, the Me counter 25, the drive circuit 26, the CPU 27, the ROM 28, and the RAM 29 are connected to an I/O (input/output) bus 30. The TDC signal from the waveform shaper 24 is supplied to the CPU 27 for interrupting operations. As shown in FIG. 2, the sensors 10 to 12 are connected to the level correcting circuit 21, while the sensor 13 is connected to the waveform shaper 24.

In the above-mentioned arrangement of the control circuit 16, the information representative of an angular position $\theta_{th}$ of the throttle valve, the intake air absolute pressure $P_{BA}$, and a coolant temperature $T_W$ are selectively supplied from the A/D converter 23 to the CPU 27 through the I/O bus 30. In addition, the information of a count value $M_e$ indicative of the value in inverse proportion to the rotating speed $N_e$ of the engine is supplied from the counter 25 to the CPU 27 through the I/O bus 30. The arithmetic operating program for the CPU 27 and various kinds of data are preliminarily stored in the ROM 28. The CPU 27 reads the foregoing respective information in accordance with this operating program and determines the fuel injection time duration of the injector 15 corresponding to the amount of the fuel to be supplied to the engine 4 on the basis of this information synchronously with the TDC signal from a predetermined calculating equation. The CPU 27 allows the drive circuit 26 to drive the injector 15 for only the fuel injection time duration thus derived, thereby supplying the fuel to the engine 4.

Figure 4:
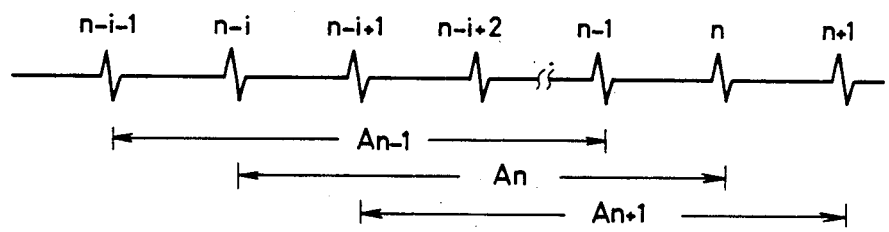
FIG. 4 is a diagram showing the counting operation of an Me counter in the circuit in FIG. 3.

It is now assumed that the number of cylinders of the engine 4 is i and that the TDC signals are intermittently generated as shown in FIG. 4. In this case, if the n-th TDC signal is supplied to the Me counter 25, the Me counter 25 outputs the count result corresonding to the period $A_n$ from the time point of the generation of the (n−i)th TDC signal that was generated only i pulses before until the time point of the generation of the n-th TDC signal. In a similar manner as above, when the (n+1)th TDC signal is supplied to the Me counter 25, it outputs the count result commensurate with the period $A_{n+1}$ from the generation time point of the (n−i+1)th TDC signal until the generation time point of the (n+1)th TDC signal. Namely, the period of one cycle (suction, compression, explosion, exhaust) of each cylinder is counted.

Figure 5:
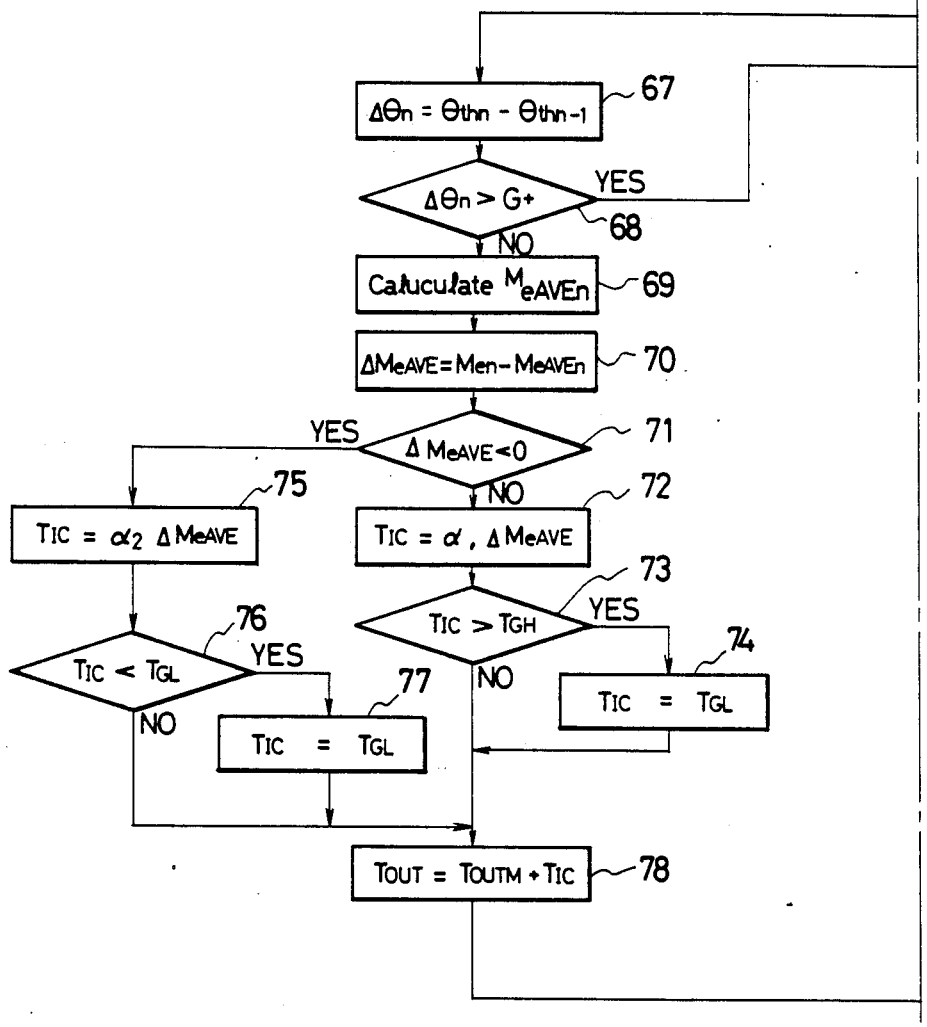
Figure 5:
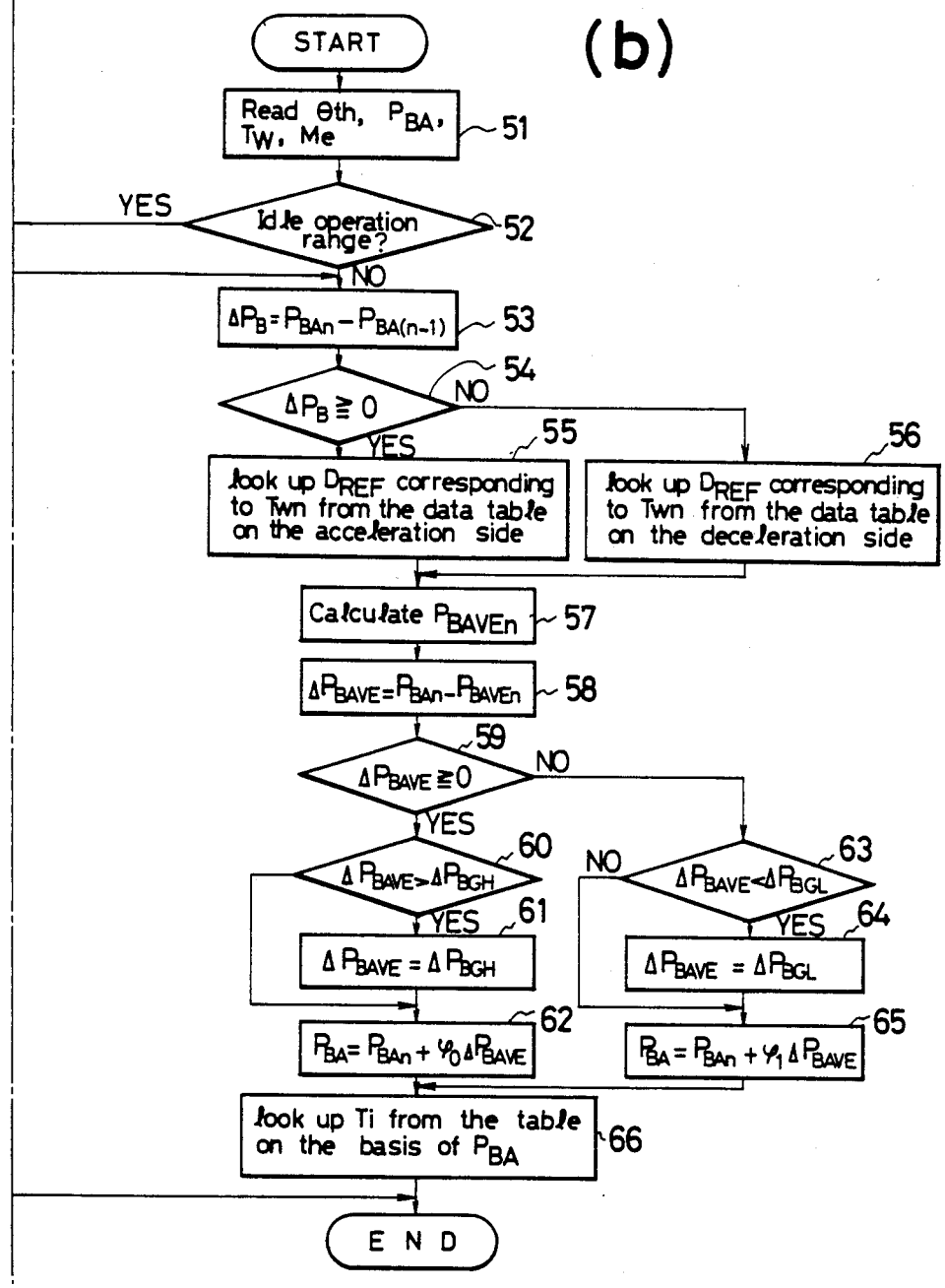

The method for controlling the fuel supply according to the invention that is executed by the control circuit 16 will now be described with reference to the operation flowchart in FIG. 5.

Figure 6:
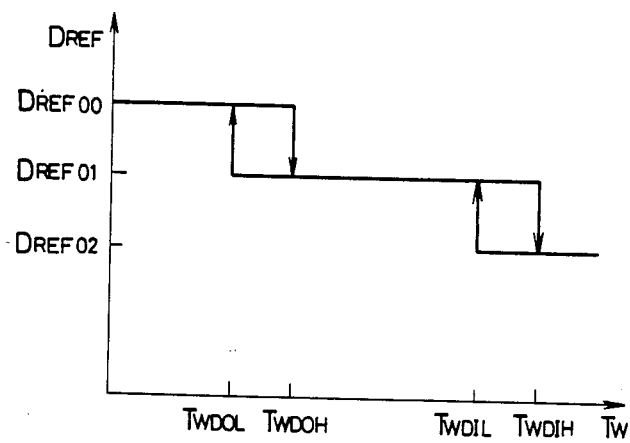
FIGS. 6 and 7 are set characteristic diagrams of a constant $D_{REF}$.
Figure 7:
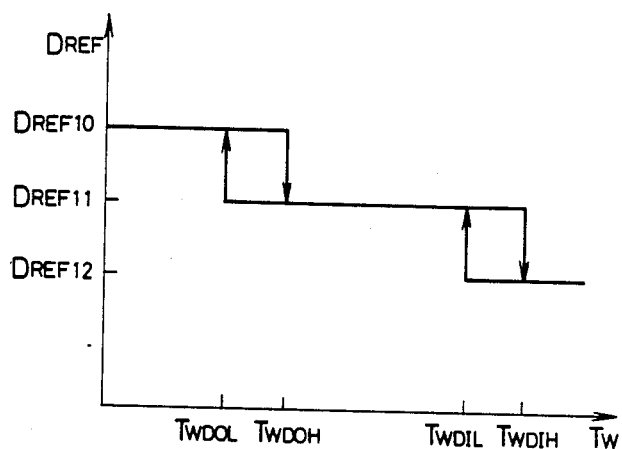

In this procedure, the throttle valve angular position $\theta_{th}$, the intake air absolute pressure $P_{BA}$, the coolant temperature $T_W$, and the count value $M_e$ are respectively read synchronously with the n-th TDC signal and are set as present sampling values $\theta_{thn}$, $P_{BAn}$, $T_{Wn}$, and $M_{en}$. These sampling values are stored in the RAM 29 (step 51). The sampling value $M_{en}$ of the count value $M_e$ corresponds to the period $A_n$. Next, a check is made to see if the engine 4 is in the idle operation range or not (step 52). This discrimination is made on the basis of the engine rotating speed $N_e$ which is derived from the count value $M_e$, the coolant temperature $T_W$, and the throttle valve angular position $\theta_{th}$. In other words, it is decided that the engine is in the idle operation range under the conditions of high coolant temperature, low angular position of the throttle valve, and low engine speed. In other cases, not in the idle operation range, the preceding sampling value $P_{BA(n-1)}$, of one sampling before the intake air absolute pressure $P_{BA}$, is read out from the RAM 29, and then the subtraction value $\Delta P_B$ between the present sampling value $P_{BAn}$, at this time and the previous sampling value $P_{BA(n-1)}$ is calculated (step 53). Subsequently, a check is made to see if the subtraction value $\Delta P_B$ is larger than 0 or not (step 54). If $\Delta P_B \geq 0$, it is determined that the engine is being accelerated, so that a constant $D_{REF}$ corresponding to the sampling value $T_{Wn}$ of the coolant temperature $T_W$ is looked up (step 55) using the data table on the acceleration side, the characteristics of which, as shown in FIG. 6, were preliminarily stored as data in the ROM 28. If $\Delta P_B < 0$, it is determined that the engine is being decelerated and a constant $D_{REF}$ responsive to the sampling value $T_{Wn}$ of the coolant temperature $T_W$ is looked up (step 56) by use of the data table on the deceleration side, the characteristics of which, as shown in FIG. 7, were preliminarily stored as data in the ROM 28, similarly to the case where $\Delta P_B \geq 0$. The constant $D_{REF}$ gives a degree for averaging of the detection value $P_{BAn}$ of the pressure in the intake air passage in the present calculation. Even if the coolant temperatures are the same, the constant $D_{REF}$ upon acceleration is set to be larger than that upon deceleration. The constant $D_{REF}$ and constant A satisfy the relation of $1 \leq D_{REF} \leq A-1$. The constant A is used together with the constant $D_{REF}$ in equation (1) which will be mentioned later and serves to determine the resolution of the calculated value in equation (1). For instance, the constant A is set to 256 in the case where the CPU 27 is of the eight-bit type. After the constant $D_{REF}$ has been set in this way, the reference value $P_{BAVE(n-1)}$ calculated one sampling before by means of the calculating equation (1)

$$P_{BAVEn} = (D_{REF}/A)P_{BAn} + \{(A - D_{REF})/A\}P_{BAVE(n-1)} \qquad (1)$$

to obtain the reference value $P_{BAVEn}$ which is derived by averaging the sampling values $P_{BA1}$ to $P_{BAn}$ of the intake air absolute pressure is read out from the RAM 29, so that the present reference value $P_{BAVEn}$ is calculated from equation (1) (step 57). The amount of the fuel deposition onto the wall surface in the intake manifold is preliminarily considered for the reference value $P_{BAVEn}$. The subtraction value $\Delta P_{BAVE}$ between the sampling value $P_{BAn}$ and the reference value $P_{BAVEn}$ obtained is calculated (step 58). A check is made to see if the subtraction value $\Delta P_{BAVE}$ is larger than 0 or not (step 59). When $\Delta P_{BAVE} \geq 0$, it is determined that the engine is being accelerated and then a check is made to see if the subtraction value $\Delta P_{BAVE}$ is larger than the upper limit value $\Delta P_{BGH}$ or not (step 60). If $\Delta P_{BAVE} > \Delta P_{BGH}$, the subtraction value $\Delta P_{BAVE}$ is set to be equal to the upper limit value $\Delta P_{BGH}$ (step 61). If $\Delta P_{BAVE} \leq \Delta P_{BGH}$, the subtraction value $\Delta P_{BAVE}$ in step 58 is maintained as it is. Thereafter, a correcting coefficient $\phi_0$ is multiplied by the subtraction value $\Delta P_{BAVE}$, and the sampling value $P_{BAn}$ is further added to the result of this multiplication, thereby obtaining the correction value $P_{BA}$ of the sampling value $P_{BAn}$ (step 62). On the other hand, in the case where $\Delta P_{BAVE} < 0$ in step 59, a check is made to see if the subtraction value $\Delta P_{BAVE}$ upon deceleration is smaller than the lower limit value $\Delta P_{BGL}$ or not (step 63). If $\Delta P_{BAVE} < \Delta P_{BGL}$, the subtraction value $\Delta P_{BAVE}$ is set to be equal to the lower limit value $\Delta P_{BGL}$ (step 64). If $\Delta P_{BAVE} \geq \Delta P_{BGL}$, the subtraction value $\Delta P_{BAVE}$ in step is maintained as it is. Thereafter, a correcting coefficient $\phi_1$ ($\phi_1 > \phi_0$) is multiplied by the subtraction value $\Delta P_{BAVE}$, and the sampling value $P_{BAn}$ is further added to the result of this multiplication, so that the correction value $P_{BA}$ of the sampling value $P_{BAn}$ is calculated (step 65), similarly to step 62. After the correction value $P_{BA}$ has been derived in this way, the basic fuel injection time duration $T_i$ is determined from the data table preliminarily stored in the ROM 28 on the basis of the correction value $P_{BA}$ and the sampling value $M_{en}$ of the count value $M_e$ (step 66).

On the other hand, if it is determined that the engine is in the idle operation range in step 52, the subtraction value $\Delta\theta_n$ between the present sampling value $\theta_{thn}$ of the throttle valve angular position and the previous sampling value $\theta_{thn-1}$ is first calculated (step 67). A check is made to see if the subtraction value $\Delta\theta_n$ is larger than a predetermined value G+ or not (step 68). If $\Delta\theta_n > G+$, it is decided that the engine is being accelerated, even though in the idle operation range; therefore, it is presumed that the engine will move out of the idle operation range after the fuel injection time duration is calculated and the processing routine advances to step 53. If $\Delta\theta_n \leq G+$, the reference value $M_{eAVE(n-1)}$ calculated one sampling before by means of the calculating equation (2)

$$M_{eAVEn} = (M_{REF}/A)M_{en} + \{(A - M_{REF})/A\}M_{eAVE(n-1)} \qquad (2)$$

of the reference value $M_{eAVEn}$, which is derived by averaging the sampling value $M_{en}$ of the count value, is read out from the RAM 29. In addition, the reference value $M_{eAVEn}$ is calculated from equation (2) by use of the constant A and $M_{REF}$ ($1 \leq M_{REF} \leq A - 1$) (step 69). The constant $M_{REF}$ gives a degree for averaging of the detection value $M_{en}$ of the engine rotating speed or of the value of the inverse number of the engine rotating speed until the present calculation. The subtraction value $\Delta M_{eAVE}$ between the present sampling value $M_{en}$ of the count value $M_c$ and the reference value $M_{eAVEn}$ obtained is calculated (step 70). A check is made to see if the subtraction value $\Delta M_{eAVE}$ is smaller than 0 or not (step 71). When $\Delta M_{eAVE} \geq 0$, it is determined that the actual engine rotating speed is lower than the reference engine speed corresponding to the reference value $\Delta M_{eAVEn}$, so that by multiplying a correcting coefficient $\alpha_1$ with the subtraction value $\Delta M_{eAVE}$, a correction time duration $T_{IC}$ is calculated (step 72). A check is made to see if the correction time duration $T_{IC}$ is larger than the upper limit time duration $T_{GH}$ or not (step 73). If $T_{IC} > T_{GH}$, it is decided that the correction time duration $T_{IC}$ derived in step 72 is too long, so that the correction time duration $T_{IC}$ is set to be equal to the upper limit time duration $T_{GH}$ (step 74). If $T_{IC} \leq T_{GH}$, the correction time duration $T_{IC}$ in step 72 is maintained as it is. On the contrary, if $\Delta M_{eAVE} < 0$ in step 71, it is determined that the actual engine rotating speed is higher than the reference engine speed responsive to the reference value $M_{eAVEn}$, so that the correction time duration $T_{IC}$ is calculated by multiplying a correcting coefficient $\alpha_2$ ($\alpha_2 > \alpha_1$) by the subtraction value $\Delta M_{eAVE}$ (step 75). A check is made to see if the correction time duration $T_{IC}$ is smaller than the lower limit time duration $T_{GL}$ or not (step 76). If $T_{IC} < T_{GL}$, it is decided that the correction time duration $T_{IC}$ derived in step 75 is too short, so that the correction time duration $T_{IC}$ is set to be equal to the lower limit time duration $T_{GL}$ (step 77). If $T_{IC} \geq T_{GL}$, the correction time duration $T_{IC}$ in step 75 is maintained as it is. After the correction time duration $T_{IC}$ has been set in this way, the fuel injection time duration $T_{OUTM}$ is determined, in which the time duration $T_{OUTM}$ is obtained by correcting in accordance with various kinds of parameters the basic fuel injection time duration which is read out from the fuel injection time duration data table, stored preliminarily in the ROM 28, on the basis of the present sampling values $P_{BAn}$ and $M_{en}$. Furthermore, by adding the correction time duration $T_{IC}$ to the resultant fuel injection time duration $T_{OUTM}$, the fuel injection time $T_{OUT}$ is calculated (step 78).

In the above-described fuel supply controlling method according to the invention, the average idle rotating speed is automatically derived and is set as the reference value $M_{eAVEn}$ for the sampling value $M_{en}$ of the value of reference number of the engine rotating speed. The different correcting constant $\alpha_1$ or $\alpha_2$ is multiplied by the difference $\Delta M_{eAVE}$ in dependence on the positive or negative value of the difference $\Delta M_{eAVE}$; and thereby calculating the correction fuel supply amount to be added to the fuel supply amount. Further, the upper and lower limits are set with regard to this correction fuel supply amount to eliminate significant changes in the air fuel ratio and thereby restricting the recovery force, so that the further promotion of hunting due to such a change is prevented.

In the foregoing embodiment, the Me counter 25 counts one cycle period of each cylinder of the engine 4; however, the invention is not limited to this example. It is also possible to adopt a constitution such that the Me counter 25 outputs the count result corresponding to the interval from the generation time point of the (n−1)th TDC signal until the generation time point of the n-th TDC signal in response to the n-th TDC signal with the control circuit 16 counting one-cycle periods $A_{n-1}, A_n, A_{n+1}, \ldots$ as shown in FIG. 4 from the output count value $M_c$ of the Me counter 25.

Figure 1:
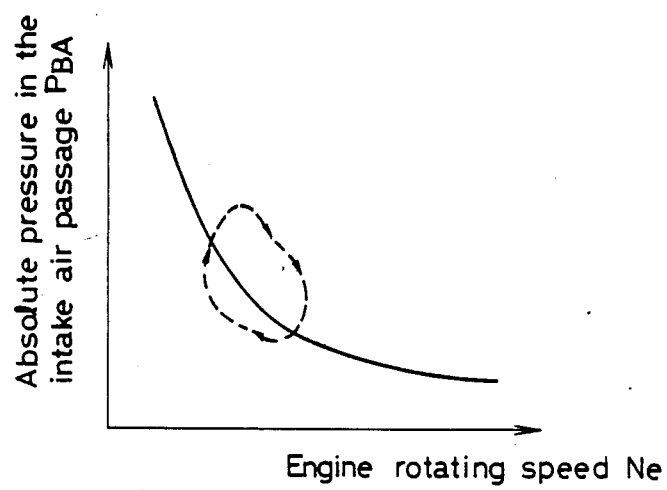
FIG. 1 is a graph showing the relation between the engine rotating speed and the absolute pressure in the intake air passage.

As described above, according to the fuel supply controlling method of the invention, the engine rotating speeds detected so far or the values of the inverse numbers thereof are averaged in response to the detection of the engine rotating speed or the value of the inverse number thereof in order to determine the reference value. The correction fuel supply amount is decided on the basis of this reference value. This correction fuel supply amount is added to the basic fuel supply amount that is determined on the basis of the engine rotating speed and the pressure in the intake air passage. Therefore, even in the case where the volume of the intake air passage is large and the pressure in the intake air passage does not follow the change in engine rotating speed as indicated by the broken line in FIG. 1, the phase lag of the return torque of the engine to the change in engine speed is reduced. Consequently, the engine rotating speed upon idling or the like becomes stable and driveability can be improved.

On the other hand, since the engine speed varies due to the time-dependent change or the like at the idle rotating speed which is mechanically set, it is necessary to adjust the correction amount. However, according to the invention, the rotating speed which is mechanically balanced is obtained as a mean value, so that there is no need to perform such an adjustment.

As described in the foregoing embodiment, the engine rotating speed or the value of the inverse number thereof is detected by counting one cycle period of each cylinder of the engine, so that a high detection accuracy is derived.

What is claimed is:

1. A method for controlling the fuel supply of an internal combustion engine having a throttle valve in an intake air system comprising the steps of:

detecting that an angular position of a crankshaft of the engine as in coincidence with a predetermined crankshaft angular position;

detecting, at each detection of said coincidence, a pressure in an intake air passage downstream of said throttle valve and an engine rotating speed of the engine or a value in inverse proportion to said engine rotating speed on the basis of an interval between the detections of said predetermined crankshaft angular position;

determining a basic amount of fuel which is to be supplied to the engine in accordance with a presently detected value $P_{BAn}$ of said pressure in said intake air passage;

setting a present reference value $M_{eAVEn}$ having a predetermined functional relationship to a presently detected value $M_{en}$ of said engine rotating speed or said value in inverse proportion thereof and to a reference value $M_{eAVE(n-1)}$ set one sampling before;

determining a correction fuel supply amount on the basis of said present reference value $M_{eAVEn}$;

adding said correction fuel supply amount to said basic fuel supply amount; and supplying an injection amount of fuel commensurate with the result of said addition to the engine.

2. A method according to claim 1, wherein said present reference value $M_{eAVEn}$ is obtained from a following equation $$M_{eAVEn} = (M_{REF}/A)M_{en} + \{(A - M_{REF})/A\} M_{eAVE(n-1)}$$

in which, A is a constant and $M_{REF}$ $(1 \leq M_{REF} \leq A-1)$ is a constant for averaging of the presently detected value $M_{en}$ of said engine rotating speed or of said value in inverse proportion to said engine rotating speed.

3. A method according to claim 1, wherein said correction fuel supply amount is determined by a subtraction value $\Delta M_{eAVE}$, being the difference between said presently detected value $M_{en}$ and said present reference value $M_{eAVEn}$.

4. A method according to claim 3, further comprising the steps of determining whether said subtraction value $\Delta M_{eAVE}$ is positive or negative, and multiplying a constant $\alpha$, which differs depending on the result of said determination by said subtraction value $\Delta M_{eAVE}$, thereby determining said correction fuel supply amount.

5. A method according to claim 1, wherein when said correction fuel supply amount exceeds an upper limit value, the correction fuel supply amount is set to said upper limit value, and when the correction fuel supply amount becomes smaller than a lower limit value, the correction fuel supply amount is set to said lower limit value.

* * * * *